Patented Oct. 18, 1932

1,883,649

UNITED STATES PATENT OFFICE

MARTIN J. ENGBERG, OF CHICAGO, ILLINOIS, ASSIGNOR, BY DIRECT AND MESNE ASSIGNMENTS, TO MAURICE PRESTON CORPORATION, OF CHICAGO, ILLINOIS, A CORPORATION OF DELAWARE

METHOD OF PREPARING BLEACHING SOLUTION

No Drawing. Application filed July 14, 1927, Serial No. 205,853. Renewed April 11, 1932.

This invention relates to bleaching solutions and aims to provide an efficient method for forming such a solution.

It has been customary in the past in the commercial production of bleach in which a caustic solution was formed and subsequently combined with chlorine, to use a predetermined weight of caustic and subsequently add a predetermined amount of chlorine, the quantity of chlorine being determined by weighing a cylinder of liquid chlorine on a delicate scale and noting the loss in weight as the chlorine was added, or, by measuring the flow of chlorine by means of an expansion tank in conjunction with a pressure gauge.

When any of the above methods were used to determine the amount of chlorine to be added to the caustic solution it was customary in the first instance to apportion much more caustic than chlorine in order to leave a considerable amount of caustic unneutralized. One of the reasons for this was the difficulty in determining the exact point of neutralization and another was the desire to have enough excess caustic in the solution to prevent any possibility of decomposition of the hypochlorites which were formed during the reaction of the caustic with the chlorine. A slight amount of excess caustic is desirable to prevent such decomposition but to much greatly decreases the bleaching activity of the hypochlorites. In order to minimize the amount of excess caustic used I first neutralize the caustic and thereafter add the minimum amount of caustic in proportion to the chlorine necessary for stabilizing purposes. In order to do this it is necessary to accurately determine the exact point of neutralization of the caustic.

It is therefore the primary object of this invention to provide a method for more accurately determining the amount of chlorine that is added to the caustic in solution.

It is also an object of this invention to eliminate the necessity for using either a delicate scale or an expansion tank to determine the amount of chlorine that is added to the caustic in solution.

It is further an object of this invention to provide a method for preparing a bleaching solution in which there need be no unnecessary amount of caustic used.

Other and further objects of this invention will be apparent as the same becomes better understood from an examination of the specification and claims.

In carrying out my invention I prefer to use a caustic solution containing a predetermined amount of caustic in order to calculate the exact amount of chlorine which will react with the caustic, although it is not necessary to know the exact amount of caustic in order to practice my invention in its broadest sense, as the chlorine will neutralize it at an absolutely definite stage and this stage is precisely determined by an indicating chemical.

After the caustic solution has been formed, such as alkaline hydroxide or alkaline carbonate, the chlorine is slowly added, preferably through a diffuser such as is disclosed in the copending application of Everett H. Taylor, Serial No. 178,906, filed March 28, 1927. The use of such a diffuser permits a more dilute solution of caustic to be used than otherwise would be the case, as the diffuser admits the chlorine in such finely divided bubbles that they may be readily absorbed even by a dilute solution of caustic. Thus the diffuser facilitates the use of this invention. The solution will be nearly neutralized after a period varying with the pressure of the gas and the amount of the caustic alkali used. From the fact that for every 1.128 pounds of caustic soda, for example, used it will take one pound of chlorine for neutralization, the operator is able to gauge within reasonable limits when the process is approaching the neutralization point.

At this stage of the process the operator adds to the solution in the tank or jar, or to a specimen drawn therefrom, a small quantity of a solution of a chemical such as phenolphthalein, litmus or other indicator. In the case of phenolphthalein, the alkaline salt of which is of a red color, such color is displayed as long as there is any free alkali present. The phenolphthalein alkaline salt is soon bleached colorless and phenolphthalein is periodically added to the solution during the addition of the chlorine. When upon any addition of the phenolphthalein no red color is displayed it indicates that there is no longer any free alkali present and that the neutralization point has been reached, or, when the red color is formed and almost instantaneously bleached colorless, the chlorination is finished.

The flow of gas is then shut off and a slight amount of alkali is added to counteract any decomposition products which may have been formed by any slight excess of chlorine and render the solution more stable by making it slightly alkaline. The reason for this is that during the reaction between the alkali and the chlorine the alkali is broken down into hypochlorites and salts such as chlorides. The hypochlorite is an effective bleaching agent and if the solution is left acid or not sufficiently alkaline these hypochlorites are apt to break down into chlorates, which are useless and represent a loss in both caustic and chlorine.

In case the litmus solution is used instead of phenolphthalein a blue color will be formed instead of the red color as long as any free alkali is present. This blue color will soon disappear by the bleaching action of the solution and like the red color of the phenolphthalein it will not appear at all upon any addition of the indicator when the neutralization point has been reached.

Some indicators are not bleached colorless, but the color is changed, thus methyl orange solution is changed from an orange in the alkaline solution to a very light yellow, almost colorless. With this class of indicators, samples for testing should be drawn from the tank.

When a predetermined amount of caustic has been used in the first instance and the neutralization point has been arrived at, as described above, the amount of chlorine in the solution may be readily calculated from the knowledge that for every 1.128 pounds of caustic soda used it will take one pound of chlorine for neutralization. To make the solution slightly alkaline for the reasons pointed out, an excess of caustic soda, about .072 by weight of the chlorine used, or even slightly less, should be added. The resulting bleaching solution will then be alkaline and that to less than .1% by weight of the solution. Any acidity or decomposition products due to any slight excess of chlorine will have been corrected and the solution will keep better than it would without such correction and at the same time an unnecessary excess of caustic will not have been used.

In case soda ash is used instead of the caustic soda, 3.3 parts by weight is used to 1 part by weight of chlorine and after chlorinating, about .2 part of soda ash is added to render the solution slightly alkaline.

The use and the advantages of the above method for preparing a bleaching solution will be apparent from the foregoing without further description.

I am aware that many changes may be made and many details varied without departing from the principles of this invention. I therefore do not wish to be limited to the details described.

I claim:

1. The method of forming a bleaching solution which consists in forming an alkaline solution containing a predetermined amount of alkali, successively passing chlorine through said solution, the chlorine being adapted to react with the alkali to neutralize the same and form a bleaching agent, adding successive amounts of an indicator to the alkaline solution during the addition of said chlorine, the characteristic color of the alkali salt of which indicator is displayed only so long as the alkaline solution has not been neutralized, and discontinuing the addition of chlorine whenever the said characteristic color fades quickly upon the addition of said indicator.

2. The method of forming a bleaching solution which comprises forming a solution of sodium hydroxide of predetermined strength, continuously passing chlorine through said solution, adding successive amounts of an indicator to the said solution during the addition of the chlorine, the characteristic color of the sodium salt of which indicator is displayed only so long as the solution has not been neutralized, and discontinuing the addition of chlorine to the solution whenever the characteristic color fades quickly upon the addition of the said indicator.

3. The method of forming a hypochlorite solution, which comprises forming an alkaline solution containing a predetermined amount of alkali, successively passing chlorine through the solution to neutralize the alkali and form a bleaching agent, adding successive amounts of phenolphthalein to the solution during the addition of chlorine, and discontinuing the passage of chlorine into the solution whenever the color of the said indicator fades quickly upon being added to the solution.

4. The method of forming a sodium hypochlorite solution which comprises forming a solution of sodium hydroxide of predetermined strength, passing successive amounts of chlorine through said solution, adding successive portions of phenolphthalein to the caustic solution during the addition of chlorine, and discontinuing the passage of chlorine to the solution whenever the characteristic color of phenolphthalein fades quickly upon the addition of the same to the solution.

5. In the commercial production of bleach, the method of forming a bleaching solution which comprises continuously diffusing chlorine into a solution of an alkali to neutralize the same and to form a bleaching agent, said diffusion being effected in such finely divided bubbles that the chlorine is readily absorbed by the solution, and adding to the solution during the diffusion of the chlorine into the solution, successive amounts of an indicator which is adapted to display a definite color characteristic prior to the neutralization point of said chlorine, and to undergo a definite change when the said point is reached, and discontinuing the diffusion when the color formed upon the addition of the indicator fades quickly upon being introduced into the solution.

In witness of the foregoing I affix my signature.

MARTIN J. ENGBERG.